United States Patent Office 3,448,133
Patented June 3, 1969

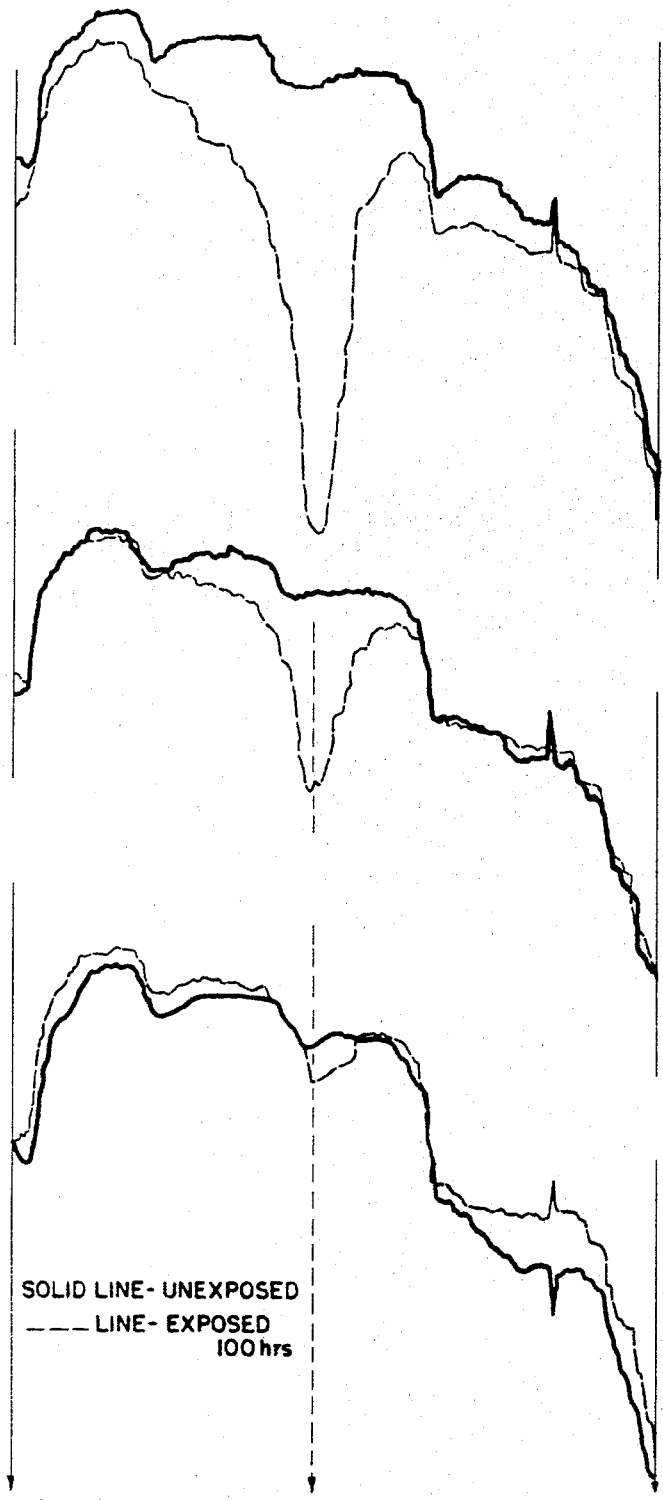

3,448,133
BENZOPHENONE STABILIZERS, STABILIZED COMPOSITIONS AND METHODS FOR MAKING SAME
Albert F. Strobel, Delmar, and Sigmund C. Catino, Castleton, N.Y., assignors to GAF Corporation, New York, N.Y., a corporation of Delaware
Filed May 25, 1964, Ser. No. 369,660
Int. Cl. C07f 15/04
U.S. Cl. 260—439                        1 Claim

ABSTRACT OF THE DISCLOSURE

A nickel complex of a 2-hydroxy-4-higher alkoxy benzophenone compound, useful as a UV absorber. Stabilized polymeric compositions containing such absorber.

---

This invention relates to new, useful and outstanding benzophenone type stabilizers, and in particular to 2-hydroxy-4-alkoxy benzophenone compounds which are outstanding ultraviolet light absorbers in the form of their nickel complexes, to compositions stabilized with such compounds, to methods for making such compounds, compositions, and to the uses of such compounds.

It is well known that organic materials to varying degrees undergo deterioration and degeneration when exposed to actinic radiation, and in particular to ultraviolet radiation. While the primary source of ultraviolet radiation is the sun, the problem of protecting organic materials against this source of ultra-violet light is not limited only to materials which are in direct exposure to sunlight since all organic materials during daylight hours are subjected to some degree to the effects of ultra-violet light whether in direct exposure to sunlight or not.

Many compounds are known which have the property of absorbing electromagnetic radiation especially within the range of about 2800 to 4000 A. Such compounds should have utility as absorbers for radiation within this wavelength and consequently might serve to stabilize other organic materials. The problem, however, in the successful adaptation and use of a given ultra-violet light absorbing compound depends upon several factors, however. (1) The compounds must absorb strongly within the desired region in order to function properly. (2) The compound must be compatible with the material to be stabilized. (3) Compatibility must be present not only in a physical and chemical sense, but also in a visual sense. Thus, for example, where it is desired to stabilize a clear vinyl film, a deeply colored absorber would not be indicated. (4) The compound must be sufficiently stable to the ultra-violet radiation it itself is absorbing otherwise the practical utility of the compound is nil. (5) The compound must be economically feasible to produce. (6) The compound must be economically feasible to compete with the myriad of other possible ultra-violet light stabilizers.

Obviously, many compounds will serve admirably for one purpose but will be completely useless for another. Thus, sun-screening agents employed in the usual suntanning lotions must have high ultra-violet light absorptive capacity but need not be particularly stable since their use is for only a very limited period of time. On the other hand, stabilizers for plastic materials intended for outdoor exposure must have exceptionally high light stability characteristics. Further, the problem of chemical and physical compatibility makes for some compounds excellent absorbers in one type of substrate and in another, substantially no utility.

It is therefore quite clear that utility of any particular compound as an ultra-violet light absorber for any specfic purpose is highly unpredictable and the discovery, therefore, of a class of compounds which are readily manufactured, extremely stable to light, and readily compatible with a tremendous variety of organic materials is an outstanding achievement.

Hydroxy benzophenone compounds are well known ultra-violet light absorbers and have been suggested in numerous applications for this function. The derivatives presently available, however, in general suffer from many deficiencies. Wide compatibility with varying chemical structures is lacking. Often, in order to achieve an acceptable degree of stablization of a given organic material, an amount of absorber is required which is economically unattractive. It has now been discovered that 2-hydroxy-4-alkoxy benzophenone compounds complexed with nickel form a class of ultra-violet light absorbing compounds which are outstanding in their physical and chemical compatibilities with a great variety of organic substrates. These nickel complexes, in addition, give protection far in excess of that which is to be expected from the heretofore known properties of the uncomplexed benzophenone compounds. The nickel complexes of the 2-hydroxy-4-alkoxy benzophenone compounds thus are characterized as outstanding synergistic combinations which afford about ten times the protection to organic materials as the uncomplexed compounds.

It is therefore an object of the present invention to provide new and useful ultra-violet light absorbers which are outstanding stabilizers for organic materials.

It is another object of the present invention to provide new and useful nickel complexes of 2-hydroxy-4-alkoxy benzophenone compounds which are outstanding absorbers for ultra-violet light and excellent stabilizers for organic materials susceptible to degradation by such radiation.

It is still another object of the present invention to provide processes for the preparation of new and useful nickel complexes of 2-hydroxy-4-alkoxy benzophenone compounds.

It is still a further object of the present invention to provide new and useful organic compositions characterized by outstanding and improved resistance to degradation and deterioration by ultra-violet light.

Still another object of this invention is to provide compositions containing nickel complexes of 2-hydroxy-4-alkoxy benzophenone compounds with improved stability to ultra-violet light deterioration.

It is still a further object of the present invention to provide processes for stabilizing organic materials against the degradative effects of actinic radiation, and especially ultra-violet light.

Other objects will appear hereinafter as the description proceeds.

The nickel complexes of the 2-hydroxy-4-alkoxy benzophenone compounds are a complex union of nickel and the corresponding benzophenone compound wherein the ratio of nickel to benzophenone compound may vary from about 1:1 to 1:2. The preparation and description of such nickel complexes will be described below.

The 2-hydroxy-4-alkoxy benzophenone compounds which are employed in the preparation of the nickel complexes of the present invention have the following general formula:

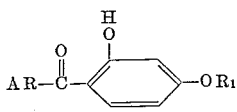

wherein AR represents a benzene ring which is devoid of oxy, oxo, thio analogs thereof and amino groups and $R_1$ represents an alkyl radical of at least 8 carbon atoms. Except for those substituents which must be avoided in the benzene ring as enumerated above, there may be present as substituents in this ring any other groupings, and specifically the preferred groupings are alkyl and halogen. As halogen atoms, there may be employed the four well known halogens, namely, fluorine, chlorine, bromine and iodine. As alkyl substituents, there may be employed alkyl groups of from 1 to about 30 carbon atoms, and preferably those of from 1 to 8 carbon atoms. In addition to alkyl there may also be employed simple substituted alkyl groups which are similarly devoid of oxy, oxo, thio analogs thereof and amino groups. These include haloalkyl and cyanoalkyl. The $R_1$ alkyl radical may be from 8 to about 30 carbon atoms, but it is preferred to employ those alkyl radicals containing from about 8 to about 18 carbon atoms.

The general method for obtaining the 2-hydroxy-4-alkoxy benzophenone compounds to be employed in forming the nickel complex compounds of this invention involves a reaction of the corresponding 2,4-dihydroxy benzophenone compounds with a haloalkane. Where the desired $R_1$ substituent is available in a resorcinol compound from some other method of synthesis, then the suggested method of synthesis would involve reaction with benzoyl halide. Since a readily obtainable source of hydroxy benzophenone compounds results from the condensation of resorcinols with benzoic acid, then the benzophenone precursors for the nickel complex compounds of this invention may also be prepared by the condensation of resorcinol, or resorcinol ethers with benzoic acid, substituted benzoic acid, benzoyl halides or substituted benzoyl halides. Where the desired $R_1$ substituent is available in a resorcinol compound, the desired benzophenone compound may be formed directly. Otherwise, reaction with a haloalkane as described above is indicated.

Among the specific 2,4-dihydroxy benzophenone compounds which may be employed as starting materials for the corresponding 4-alkoxy derivatives which are then used to complex with nickel are the following:

2'- (or 3' or 4')- methyl or any alkyl up to about 30 carbon atoms such as ethyl, n-propyl, iso-propyl, n-butyl, iso-butyl, tert.-butyl n-amyl, iso-amyl, tert.-amyl, n-hexyl, iso-hexyl, n-heptyl, iso-heptyl, nonyl-1, nonyl-2, nonyl-3, nonyl-5, 2-methyl octyl-2, nonacosyl, myrisyl (30 carbons) alkenyl, allyl ($CH_2$=$CHCH_2$—)
methallyl ($CH_2$=$C(CH_3)CH_2$—)
crotyl ($CH_3CH$=$CHCH_2$—)
butenyl-1 ($CH_2$=$CH$—$CH$—$CH_3$)
| pentyl-1, γ-isopropl allyl, β-ethyl-γ-propyl allyl, 2-methyl-octenyl-6, decenyl-1, decenyl-2, undecenyl, dodecenyl-2, octadecenyl, docosenyl, pentamethyl eicosenyl, aryl, phenyl, tolyl, xylyl, cumyl, α-naphthyl, β-naphthyl, halophenyl, halotolyl, haloxylyl, phenanthranyl diphenyl and the alkyl substituted derivatives thereof.

Substituted alkyls, e.g., cyanoethyl, cyanopropyl (n), cyanoisopropyl, cyanobutyl (n), cyanoisobutyl, cyanoamyl (n) and cyanoisoamyl.

Dialkyl substituted compounds such as: 2',3'-dimethyl, 2',4'-dimethyl, 2',5'-dimethyl, 2',6'-dimethyl, 3',4'-dimethyl, 3',5'-dimethyl, 2'-ethyl-4-propyl, 2'-ethyl-6'-propyl, 5'-ethyl-2'-propyl, 3'5'-diisopropyl, 2',4'-diisobuty, 2',4'-dinonyl, 2',4'-dipentyl, 2',4'-diethyl, 2',5'-diethyl, 3',4'-diethyl, 3',5'-diethyl, 2',4'-di-sec.-butyl, 2',4'-di-tert.-butyl, 2',4'-diamyl, 2'-butyl-5'-ethyl, 4'-butyl-2'-ethyl, 2'-tert.-butyl-5'-ethyl, 2'-tert.-butyl-6'-ethyl, 4'-tert.-butyl-2'-isoctyl, 2'-tert.-butyl-4'-(1,1-dimethyl propyl).

Trialkyl substituted compounds such as: 4'-n-butyl, 2',6'-di-tert.-butyl, 2',6'-di-tert.-4'-ethyl, 2',4',6'-triisopropyl, 2',4',6'-tri-tert.-butyl, 2',4',6'-trimethyl, 2',3',4'-trimethyl, 2',3',5'-trimethyl, 2',4',5'-trimethyl, 3',4',5'-trimethyl, 2',3',6'-trimethyl.

Tetraalkyl substituted compounds such as: 2',3',4',5'-tetramethyl, 2',3',4',6'-tetramethyl, 2',3',5',6'-tetramethyl.

Pentaalkyl substituted compounds such as pentamethyl.

Halo substituted compounds such as 2'(or 3', or 4')-bromo (or chloro, fluoro or iodo).

Polyhalo substituted compounds such as: 2'-bromo-4'-chloro, 3'-bromo-4'-chloro, 4'-bromo-3'-chloro, 5'-bromo-2'-chloro, 2'-bromo-4',6'-dichloro, 3' (or 4')-bromo, 2',6'-dichloro, 2'-chloro-4'-fluoro, 4'-chloro-2'-fluoro, 2' (or 3')-chloro-4'-iodo, 2',4'-dibromo (or difluoro, dichloro or di-iodo), 3',4'-dibromo (or dichloro, difluoro or di-iodo), 2',4'-dibromo-6'-dichloro, 2',6'-dibromo-4'-dichloro, 2',6'-dibromo-3'-chloro-4'-ido, 2'-6'-dibromo-4'-fluoro, 2',4'-dibromo-6'-iodo, 3',5'-dibromo-2',4',6'-trichloro, 2',3' (or 2',4' or 2',5' or 2',6' or 3',4' or 3',5')-dichloro, 2',4'-dichloro-3'-fluoro, 2',4'-difluoro (or diiodo), 2',6'-di-iodo, 2',4',5' (or 2',4',6' or 2',3',6')-tribromo (or trichloro).

Mixed haloalkyl substituted compounds such as: 2' (or 3')-bromo (or chloro or fluoro or iodo)-4'-methyl (or isopropyl or sec.butyl or tert.butyl), 4'-bromo (or chloro or fluoro or iodo)-2'-methyl (or ethyl or isopropyl or tert.butyl or hexyl or heptyl), 2'-bromo-4'-chloro-3',5',6'-trimethyl, 4'-bromo-2',6'-di-sec.butyl, 3'-bromo-2'-4'-6'-trichloro, 2'-butyl-4'-chloro, 5'-butyl-2'-chloro, 2'-sec.-butyl-4'-chloro, 2'-tert.butyl-4',6'-dichloro, 2'-n-butyl-4',6'-di-iodo, 4'-tert.butyl-2',6'-dichloro, 4'-chloro-2',6'-bis(1,1,3,3-tetramethyl butyl) 4'-chloro-2'-heptyl-6'-hexyl, 2'-chloro-3',4',5',6'-tetramethyl, 2' - chloro - 3',5',6'-trimethyl, 2',4'-diamyl-6'-chloro, 2',4-dibromo-5'-pentadecyl, 2',6'-dibromo-3',4',5' - trimethyl, 2',4'-di-iodo-6'-n-propyl, 4'-ethyl-2',6'-di-iodo, 4'-fluoro-2'-heptyl, 4'-fluoro-2'-hexyl and the like.

To effect the etherification of the 4-hydroxy group of the 2,4-dihydroxy benzophenone, among numerous procedures, the preferred one, as pointed out above, involves the alkaline condensation with a halo alkane. The preferred halo alkane is a bromo alkane although it is feasible to employ a chloro- or iodoalkane. The alkane moiety of the haloalkane is obviously dependent upon the alkyl group which it is desired to introduce into the 4-position of the hydroxy benzophenone compounds. The general procedure for forming the 4-alkoxy compounds involves refluxing a mixture of the 2,4-dihydroxy compound in a suitable solvent such as methyl ethyl ketone in the presence of a small amount of potassium iodide and anhydrous potassium carbonate and with a slight stoichiometric excess of the halo alkane. After reflux, the solvent is distilled off and the residue is drowned in a large excess of water and the pH adjusted to slightly alkaline conditions (about 9–10) with a suitable alkaline material such as aqueous caustic. The resultant material, usually a solid, is then reslurried in water, heated to about 80–100° C. at a pH of 9–10, then cooled to about 10° C. and filtered. To obtain a purer material, the product may be further recrystallized in the usual manner from alcohol or alcohol in water.

The metal complex of the subject 2-hydroxy-4-alkoxy benzophenone compounds may be prepared by the general procedure of forming a solution of the benzophenone compound with a stoichiometric amount of caustic in ethanol and the added amount of nickel in the form of a nickel salt such as nickel chloride (e.g., $NiCl_2 \cdot 6H_2O$) and then refluxing this mixture for several hours. The resultant nickel complex which forms may be separated by filtration and purified by washing with alcohol followed by water and additional alcohol. The amount of nickel salt used to form the complex will depend upon what ratio of nickel on a molar basis it is desired to have complexed with the benzophenone compound. In other words, for a 1:1 complex, equal moles of benzophenone compound and nickel compound should be used. For a 1:2 complex, one should employ twice as many moles of benzophenone compound as nickel compound.

The following examples will serve to illustrate the present invention without being deemed limitative thereof. Parts are by weight unless otherwise indicated.

EXAMPLE 1

Preparation of 2-hydroxy-4-dodecyloxy benzophenone

Into a 1-liter flask there are charged the following reactants:

| | G. |
|---|---|
| 2,4-dihydroxybenzophenone (0.5 mole) | 107 |
| Methyl ethyl ketone | 322 |
| Potassium iodide (C.P.) | 8.3 |
| 1-bromo dodecane | 137 |
| Anhydrous potassium carbonate | 70 |

This mixture is refluxed for 19 hours and then about 300 ml. of methyl ethyl ketone is distilled off (about 74% of the ketone charge. The residue in the flask is then drowned in 3 liters of water and the pH of the mixture is adjusted to 9.5 with a 40% by weight aqueous solution of sodium hydroxide. The charge is then filtered and the filter cake is reslurried in 3 liters of water, heated to 85° C. at a pH=9.5 and thereafter cooled to 10° C. The mixture is then filtered and the filter cake is washed with water. The cake is then recrystallized from 1.5 liters of isopropanol containing 3 g. of activated carbon. The product is dried in a desiccator and then air dried at 40° C. The yield is 166 g. The product has a $K_{max}=27.5$ at 325 m$\mu$. The product has a melting point of 54.1–55.8° C.

The K value described in the above example is a measure of the efficiency of the compound to filter out specified wavelengths of light. A compound with a K value of 1 is one which at a concentration of 0.1% in a thickness of 1 cm. reduces the light transmitted to 10% of the incident radiation at the specified wavelength. Thus, a compound with a $K=10$ at a given wavelength in a concentration of 0.1% will reduce the transmitted radiation at that wavelength to 10% of the incident radiation at that wavelength in a thickness of only 1 mm.

EXAMPLE 2

Preparation of the nickel complex of the compound of Example 1

Into a 500 ml. flask there are charged the following reactants:

| | | |
|---|---|---|
| Product of Example 1 | g | 19.1 |
| Potassium hydroxide flakes | g | 2.8 |
| Ethanol | ml | 200 |

The mixture is stirred until solution is effected and then there is added a solution of 6 g. of nickelous chloride hexahydrate in 100 ml. of ethanol. The entire charge is then refluxed for 2 hours and thereafter filtered after cooling down to 50° C. The filter cake is washed with 250 ml. of ethanol followed by 500 ml. of water and finally with 200 ml. of ethanol. The material is then air dried at slightly elevated temperatures to give a yield of 19.3 g. of complex wherein the ratio of phenone to nickel is 2:1. ($K_{max}=34.9$ at 292 m$\mu$ in methanol).

EXAMPLE 3

100 mg. of the product of Example 2 is milled into 100 g. of polypropylene and thereafter the mixture is pressed out in a Carver press at 250° C. to yield a film. Similar films are prepared without any absorber and also with a nickel complex of the n-butyl ether prepared as in Example 2. The three films are then exposed in an Atlas Fade-Ometer for 100 hours. The film without absorber shows evidence of severe degradation manifested in the presence of cracks throughout the polymer film. The film containing the product of Example 2 shows no visual change while that containing the butyl ether-nickel complex shows some visual evidence of degration (a fair amount of cracking is observed). Infrared absorption characteristics of the three films are then measured to ascertain the presence of carbonyl groups in the polymer molecule. The presence of carbonyl groups shows as a strong absorption in the curve at 1750–1700 m$\mu$. The film c containing the absorber of Example 2 shows substantially no absorption due to carbonyl groups being present. The film a without any absorber shows a high carbonyl formation and that film b with the butyl ether compound shows a moderate degree of carbonyl formation. In the drawing, FIGS. 1, 2 and 3 show the infrared absorption curves of respective films a, b and c.

In order to ascertain the relative advantages of the nickel complex of Example 2 over the uncomplexed compound of Example 1, polypropylene films are prepared containing on the one hand, 0.1% of absorber of Example 2 and 1% on the other hand of Example 1. These are also exposed for 100 hours similarly as described above for the other samples and the film containing the absorber of Example 2 again shows no visible evidence of degradation. The film containing the compound of Example 1 in an amount ten times that used in the other sample shows a slight visible evidence of degradation. Infrared absorption curves confirm the more efficient stabilization of the film containing the absorber of Example 2. This demonstrates that the nickel complex of Example 2 is more than ten times better than the uncomplexed compound for stabilizing polypropylene against the degrading effects of ultra-violet light radiation.

EXAMPLE 4

1 g. of the compound of Example 2 is dissolved in 10 g. of acetone and then this solution is stirred into 90 g. of water (at 180° F.) containing 90 mg. of a dispersing agent (Peregal O—nonionic polyoxyethylated fatty alcohol). A 10 g. sample of a "Spandex" fabric (elastic polyurethane made from metaphenylene diisocyanate and a $C_4$ di-alcohol diester) is dyed in this bath for ½ hour at 180 F. Excellent stabilizing of the fabric to ultra-violet light degradation is achieved.

EXAMPLE 5

Example 1 is repeated employing the following substituted 2,4-dihydroxybenzophenone compounds:

(A) 2'-methyl-2,4-dihydroxybenzophenone
(B) 4'-methyl-2,4-dihydroxybenzophenone
(C) 4'-n-butyl-2,4-dihydroxybenzophenone
(D) 4'-nonyl-1,2,4-dihydroxybenzophenone
(E) 3'-allyl-2,4-dihydroxybenzophenone
(F) 4'-undecenyl-2,4-dihydroxybenzophenone
(G) 2'-bromo-2,4-dihydroxybenzophenone
(H) 3'-chloro-2,4-dihydroxybenzophenone
(I) 4'-chloro-2,4-dihydroxybenzophenone
(J) 3'-bromo-4'-chloro-2,4-dihydroxybenzophenone
(K) 2'-butyl-4'-chloro-2,4-dihydroxybenzophenone
(L) 4'-butyl-2'-iodo-2,4-dihydroxybenzophenone
(M) 2'-chloro-4'-fluoro-2,4-dihydroxybenzophenone
(N) 2',3',4',5'-tetramethyl-2,4-dihydroxybenzophenone

EXAMPLES 6A–6N

Example 2 is repeated using, separately, each of the dodecyloxy compounds of Example 5.

EXAMPLE 7A

Example 2 is again repeated using 2-hydroxy-4-n-octyloxy benzophenone. The resultant 1:2 (nickel to benzophenone) complex has a $K_{max}=36.9$ at 290 m. in toluene.

EXAMPLES 7B–7M

Example 2 is further repeated using the following benzophenone compounds:
(A) 2-hydroxy-4-decyloxy benzophenone
(B) 2-hydroxy-4-hexadecyloxy benzophenone
(C) 2-hydroxy-4-octadecyloxy benzophenone
(D) 2-hydroxy-4-tridecyloxy benzophenone
(E) 2-hydroxy-4-tetradecyloxy benzophenone
(F) 2-hydroxy-4-eicosyloxy benzophenone
(G) 2-hydroxy-4-nonocosyloxy benzophenone
(H) 2-hydroxy-4-allyloxy benzophenone
(I) 2-hydroxy-4-pentenyl-1-benzophenone
(J) 2-hydroxy-4-octadecenyloxy benzophenone
(K) 2-hydroxy-4-dodecenyloxy-2-benzophenone
(L) 2-hydroxy - 4 - pentamethyleicosenyloxy benzophenone

EXAMPLE 8

Example 2 is repeated employing 12 g. of nickelous chloride. The resultant compound is a 1:1 nickel complex.

EXAMPLE 9

Example 3 is repeated using the product of Example 8. Excellent results are obtained.

EXAMPLES 10A–10D (A) Example 5A
(B) Example 5D
(C) Example 5G
(D) Example 5K

EXAMPLES 11A–11F

Example 8 is again repeated using the following benzophenones in place of the dodecyloxy compound.

(A) Example 7A
(B) Example 7C
(C) Example 7D
(D) Example 7F
(E) Example 7J
(F) Example 7H The above examples illustrate the preparation of nickel complexes of the present invention and their use in polypropylene and a polyurethane. These complexes may of course be used to protect organic materials in general which are susceptible to ultra-violet light degradation. The efficacy and desirability of these compounds for such use, however, will of course depend primarily upon the compatibility with the organic substrate to be protected. In view of the hydrophobic or non-polar character of the compounds of this invention the greatest utility will be with materials which are also non-polar or hydrophobic. In many applications, however, excellent protection will result even though the organic material is not conventionally considered hydrophobic or non-polar. Thus on a relative scale, polyolefins are highly non-polar and hydrophobic, whereas nylons (polyamides), polyesters and polyvinyl acetate would, by comparison, be deemed polar. The compounds of this invention, however, may be used with such materials. Still further, in many liquid aqueous systems, the compounds of this invention may be used in dispersed form or dissolved in a suitable solvent and emulsified in such aqueous system whereby protection may be afforded thereto. The most outstanding performance of the compounds of this invention lies in their utility with polyolefins such as derived from the polymerization of α-olefins which include ethylene, propylene, butene-1, pentene-1, 4-methyl pentene-1, 3-methyl butene-1, and the like. They are also outstanding stabilizers for polyvinyl chloride, polyvinylidene chloride, polystyrene, polyurethanes, among others. In utilizing the compounds of this invention for stabilizing organic materials, the amounts to be employed are not critical and will vary widely depending upon the nature of the organic material, the conditions to which it is to be exposed and the degree of stabilization desired. In general, however, amounts of stabilizer of from about 0.01% to about 10% by weight based on the weight of the organic material may be used, and preferably amounts from 0.1% to about 2% by weight based on the weight of the organic material. The compounds of this invention may be incorporated into the organic material in any convenient manner, again depending upon the nature of the compositions to be stabilized. The compounds may be dissolved in a suitable solvent or as illustrated in the examples, milled directly into the composition where this is feasible. The latter is particularly desirable in working with plastic materials, especially since solvents are usually not deemed advisable. This technique is particularly advantageous with the compounds of this invention because of the low degree of volatility at elevated temperatures, such as normally encountered in the milling and processing of plastic materials. This is in contradistinction to the majority of other ultra-violet stabilizers and especially of the benzophenone types which are not so characterized. In the employment of the compounds of this invention for stabilizing organic materials, it is of course clear and obvious that other materials may be used therewith, and especially those which are conventional with the organic product in question. Thus, in the case of plastic or resin materials, the usual plasticizers, films, antioxidants, and other heat and light stabilizers may be used. In the case of fibers and textile materials, the usual finished agents, brighteners and textile auxiliaries may also be used.

Other variations in and modifications of the described processes which will be obvious to those skilled in the art can be made in this invention without departing from the scope or spirit thereof.

We claim:
1. A nickel complex of a phenone compound of the formula:

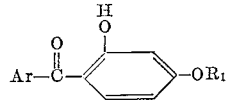

wherein Ar is a benzene ring devoid of oxy, oxo, thio analogs thereof and amino and $R_1$ is octadecyl.

References Cited

UNITED STATES PATENTS

| | | | |
|---|---|---|---|
| 3,361,709 | 1/1968 | Bown et al. | 260—45.75 |
| 3,324,158 | 6/1967 | Cyba | 260—45.75 |
| 3,098,863 | 7/1963 | Dessauer et al. | |

DONALD E. CZAJA, *Primary Examiner.*

H. E. TAYLOR, Jr., *Assistant Examiner.*

U.S. Cl. X.R.

260—45.75

UNITED STATES PATENT OFFICE
CERTIFICATE OF CORRECTION

Patent No. 3,448,133                  Dated June 3, 1969

Inventor(s) A. F. STROBEL ET AL

It is certified that error appears in the above-identified patent and that said Letters Patent are hereby corrected as shown below:

Column 1, line 45, "compounds" should read -- compound --.
Column 4, line 3, "2'-ethyl-4-propyl" should read -- 2'-ethyl-4'-propyl --; line 9, "isoctyl" should read -- isooctyl --; line 45, "2',4-dibromo" should read -- 2',4'-dibromo --.
Column 7, beneath "EXAMPLES 10A-10D" in line 30, a new line should be inserted reading -- Example 8 is repeated using the following benzophenones: --.

SIGNED AND SEALED
NOV 17 1970

(SEAL)
Attest:

Edward M. Fletcher, Jr.
Attesting Officer

WILLIAM E. SCHUYLER, JR.
Commissioner of Patents